June 10, 1947.　　　F. C. ALBRIGHT　　　2,421,739
AIRCRAFT TAIL SUPPORT AND ARRESTING MEMBER
Filed Feb. 11, 1942　　　4 Sheets-Sheet 1

INVENTOR
F. C. Albright
BY
[signature]
ATTORNEY

June 10, 1947.  F. C. ALBRIGHT  2,421,739
AIRCRAFT TAIL SUPPORT AND ARRESTING MEMBER
Filed Feb. 11, 1942  4 Sheets-Sheet 2
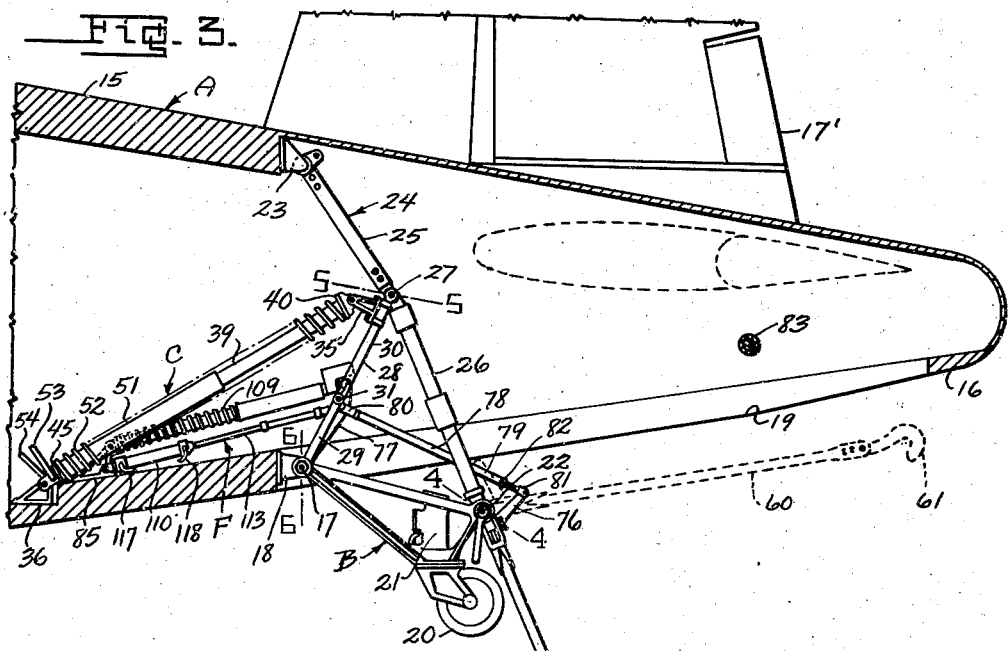
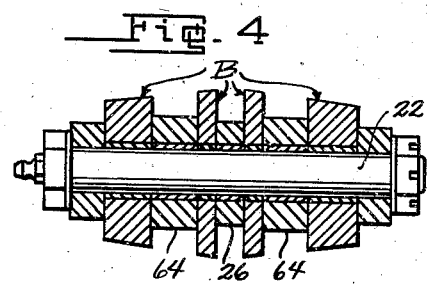
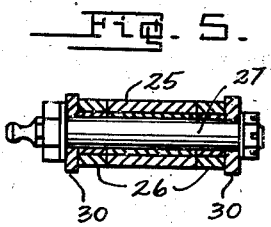
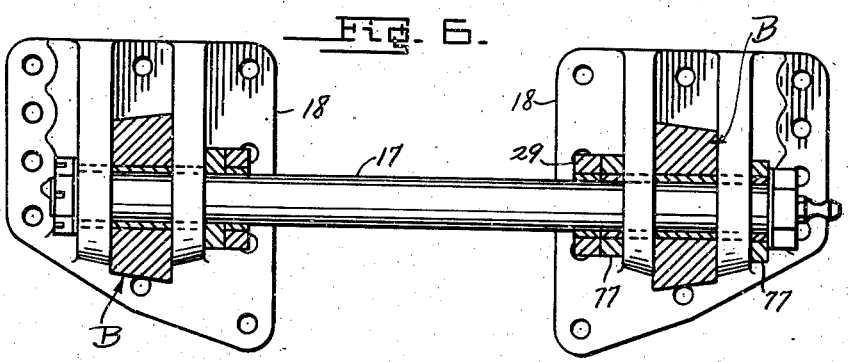
INVENTOR
F. C. Albright
BY
ATTORNEY June 10, 1947.    F. C. ALBRIGHT    2,421,739
AIRCRAFT TAIL SUPPORT AND ARRESTING MEMBER
Filed Feb. 11, 1942    4 Sheets-Sheet 3
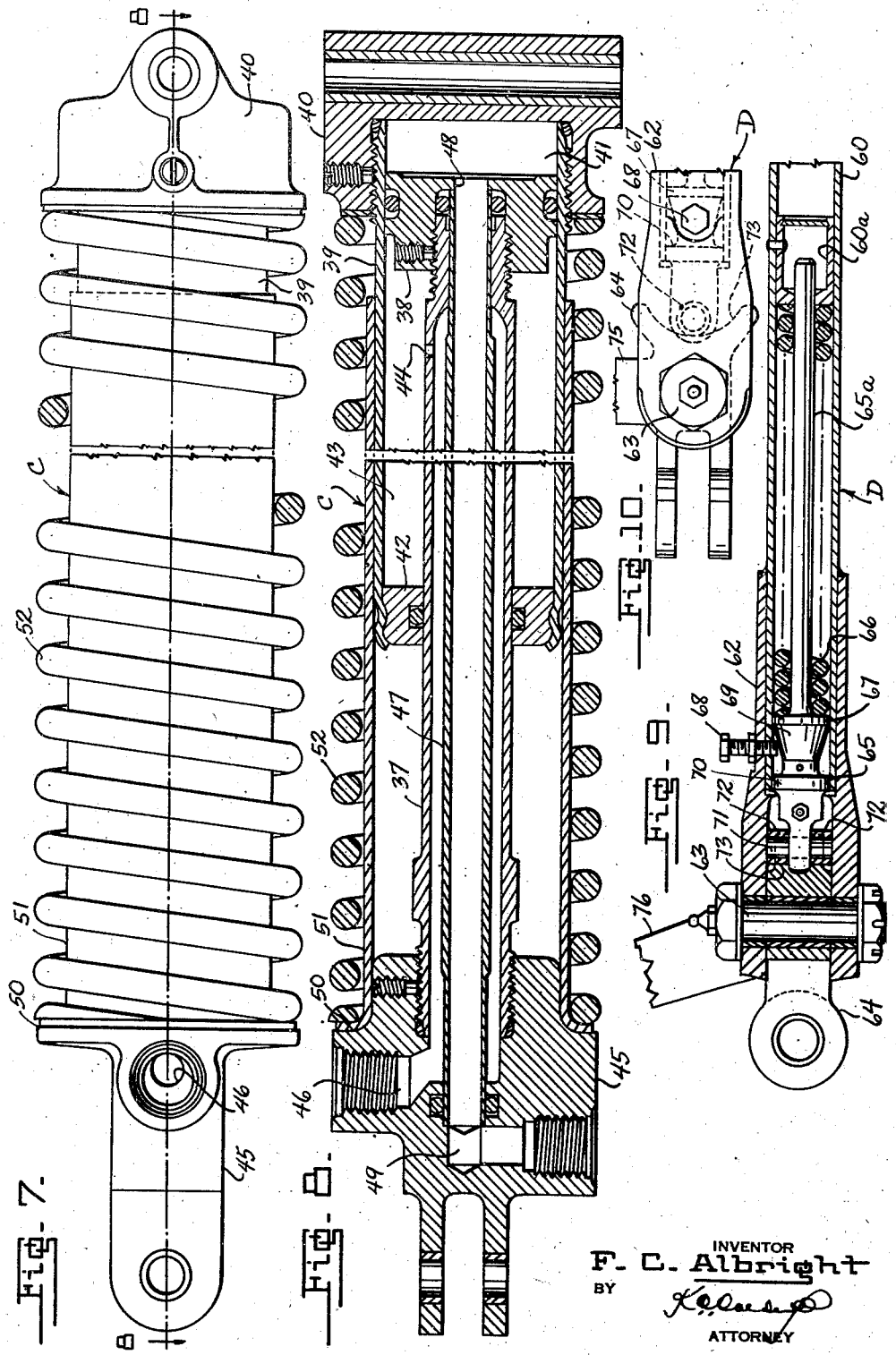
INVENTOR
F. C. Albright June 10, 1947.  F. C. ALBRIGHT  2,421,739
AIRCRAFT TAIL SUPPORT AND ARRESTING MEMBER
Filed Feb. 11, 1942  4 Sheets-Sheet 4
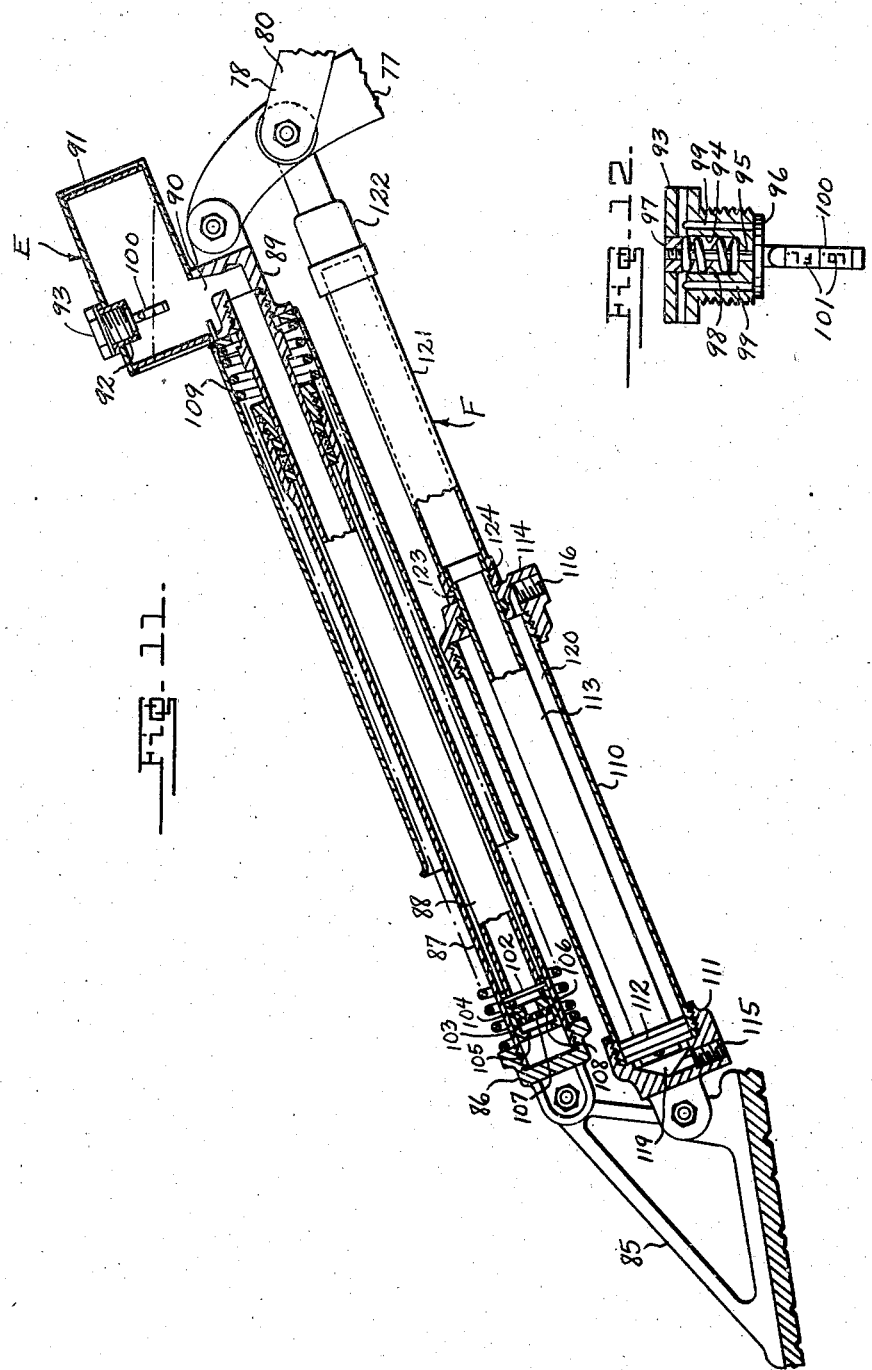
INVENTOR
F. C. Albright
BY
ATTORNEY Patented June 10, 1947

2,421,739

UNITED STATES PATENT OFFICE 2,421,739

AIRCRAFT TAIL SUPPORT AND ARRESTING MEMBER

Franklin C. Albright, San Marino, Calif., assignor to United Aircraft Corporation, East Hartford, Conn., a corporation of Delaware Application February 11, 1942, Serial No. 430,462

18 Claims. (Cl. 244—110)

1

The invention relates to improvements in aircraft arresting gear and to combined aircraft fuselage supporting and arresting gear, an important object of the invention being to provide for the attachment of an arresting member, such as a hook, to the aircraft tail support frame well below the confines of the fuselage in order to use a short hook.

Another object of the invention is to provide means for controlling the position of the hook substantially independently of the various positions of the tail support frame to which the hook is attached.

A further object of the invention is the provision of means supporting the hook through linkage carried by the tail support frame, so that good dampening is obtained in various positions of the hook and tail support frame for controlling hook bounce.

A still further object of the invention is to provide means for retracting and extending the hook through linkage carried by the tail support frame so that good mechanical advantages are obtained in various positions of the hook and tail support frame.

The invention also aims to provide retractable aircraft supporting and arresting gear not requiring excessive control forces and particularly well adapted to hydraulic actuation and control.

The invention further aims to provide a combined aircraft supporting and arresting gear which is light in weight and small so that it may be retracted cleanly into the fuselage.

The invention also has for an object the provision of an aircraft supporting and arresting gear which is simple and not liable to get out of order.

Other objects and advantages of the invention will become apparent during the course of the following detailed description, taken in connection with the accompanying drawings, forming a part of this specification, and in which drawings, Figure 1 is a fragmentary central vertical longitudinal sectional view of an aircraft fuselage showing the tail support including its frame and the arresting hook in their retracted or elevated positions.

Figure 2 is a view similar to Figure 1 but showing the tail support frame in its extended position and the arresting hook in its elevated position.

Figure 3 is a view similar to Figure 2 but showing the arresting hook in its lowered position.

Figures 4, 5 and 6 are sectional detail views

2 substantially on the lines 4—4, 5—5 and 6—6, respectively, of Figure 3.

Figure 7 is a fragmentary elevational view of preferred means for actuating the tail support frame.

Figure 8 is a fragmentary central longitudinal sectional view substantially on the line 8—8 of Figure 7.

Figure 9 is a fragmentary central vertical longitudinal sectional view of an automatically centering arresting member preferably forming a part of the invention.

Figure 10 is a fragmentary plan view of the arresting member shown in Figure 9.

Figure 11 is a view partly in side elevation and partly in longitudinal section showing preferred means for actuating the arresting member and dampening its movement.

Figure 12 is a vertical sectional detail view of a vent plug preferably forming a part of the dampening means shown in Figure 11.

In the drawings, which for the purpose of illustration show only a preferred embodiment of the invention, and wherein similar reference characters denote corresponding parts throughout the several views, the letter A generally designates an aircraft provided with a tail support frame B extendible and retractable by link means C, and carrying an arresting member D provided with dampening means E and extending and retracting means F.

Referring to the drawings, the aircraft A shown fragmentarily therein includes a fuselage 15 terminating in a tail 16 provided with suitable control surfaces 17'.

Pivotally secured to the tail 16, as by an axle 17 and brackets 18 shown more particularly in Figure 6, for swinging movement through an elongate opening 19 in the under side of the tail 16, is a substantially triangular shaped tail support frame B carrying at its free end portion a ground engaging castor wheel 20 which may be provided with any suitable automatic wheel aligning or centering mechanism 21. Pivotally secured between the frame B, as by a bolt 22 shown more particularly in Figure 4, and the fuselage at bracket 23, is a strut 24 including a non-resilient strut section 25 and an oleo strut section 26, these sections folding at a joint 27 intermediate the ends of the strut for retracting the tail supporting frame B. Extending between the joint 27 and the supporting frame axle 17 is a brace 28 including sections 29, 30 jointed at 31.

Secured to the fuselage and the brace section 30 are brackets 35, 36, linked by means C for extending and retracting the tail support frame B. In the example shown in Figures 7 and 8, frame extending and retracting means C includes a tubular piston rod 37 provided at one end portion with a piston head 38 reciprocably slidable within a tubular cylinder 39. Threaded on the cylinder 39 is an end cap 40 pivotally attached to the bracket 35 and defining a chamber 41 within the outer end portion of the cylinder. Fixed within the cylinder 39 at its inner end portion is an annular packing 42 slidably encircling the rod 37 and defining a chamber 43 communicating with the interior of the tubular rod 37 through an aperture 44 in the rod adjacent the piston head 38. Threaded on the opposite end of the tubular piston rod 37 is an end cap 45 pivotally attached to the bracket 36 and provided with a duct 46 communicating with the interior of the tubular piston rod. Disposed within the tubular piston rod 37 is a tubular conduit 47 having one end aligning with an axial opening 48 through the piston head 38 for communication with the cylinder end chamber 41. At its opposite end the conduit 47 is carried by the end cap 45 and communicates with a duct 49 therein. The end cap 45 is preferably annularly reduced at 50 to receive one end portion of a spring guide tube 51 telescopically sliding over the cylinder 39. Disposed between the end caps 40, 45 and encircling the spring guide tube is an expansion coil spring 52 urging the end caps apart. Connected to the ducts 46, 49 are conduits 53, 54 for introducing fluid, such as oil, under pressure to the chamber 41 or chamber 43.

Referring now to the arresting member 4, the same comprises a pivotally mounted tubular shank or rod 60 provided at its free end with a downwardly facing hook 61 for engagement with any suitable retarding means on the airfield or landing deck. Fixed on the opposite end portion of the rod 60, as shown in Figures 9 and 10, is a clevis 62 pivotally connected for transverse swinging movement, as by a bolt 63, to a cam member 64, which is in turn pivoted to the tail support frame B, for vertical swinging movement, preferably at the bolt 22 shown in Figure 4. Reciprocably slidably mounted in the tubular shank 60 is a plunger member 65 having a reduced stem portion 65a guided by a bushing 60a suitably fixed in the shank 60. Encircling the stem is an expansion coil spring 66 bearing against the plunger head 67 whereby to urge the plunger toward the cam member 64. The extent of travel of the plunger toward the cam member may be varied by adjustment of the screw 68 relative to a frusto-conical portion 69 of the plunger head. The screw 68 also coacts with an annular shoulder portion 70 of the plunger head to limit inward movement of the plunger. Extending transversely through the plunger head is a pin 71 carrying rollers 72 bearing against the free end of the cam member 64. This cam member 64 is forked, as shown in Figure 10, to provide a symmetrically curved cam surface 73 shaped so that the distance from the cam surface to the axis of the pivot bolt 63 decreases toward the central portion of the cam surface, whereby to guide the rollers 72 toward a position centrally of the cam surface. Extending laterally from the cam member is a stub 75 to which is fixedly secured a lever arm 76. Pivotally mounted on the axle 17 shown in detail in Figure 6 is a rocker arm 77 having its free end connected, as by a link assembly 78, to the lever arm 76. In the example shown, this link assembly 78 comprises a tube 79 provided at one end with a fixed clevis 80 and at its opposite end with a clevis bolt 81 and check nut 82 for adjusting the length of the link assembly. Extending transversely of the tail 16 and disposed in the path of upward travel of the shank or rod 60 is a roller 83 forming a stop.

In Figure 11 is shown a preferred means E for dampening movement of the arresting member D. Pivotally mounted on a bracket 85 is a cap 86 threadedly receiving one end of a cylindrical tube 87. Telescopically slidable within this cylindrical tube is a tubular piston 88 having a threaded outer end portion disposed within a cap 89 pivotally connected to the rocker arm 77. This cap 89 is provided with a passageway 90 extending between the interior of the piston 88 and the interior of a reservoir or dash-pot 91 fixedly mounted on the cap. The tubular piston 88 and the dash-pot 91 may be filled with fluid such as oil to a predetermined level through a suitable opening 92 in the top of the dash-pot. Threaded in the opening 92 is a plug 93 provided with an axial bore 94 reciprocably guiding a stem 95 provided at its lower and upper ends respectively with a valve disc 96 and a colar 97. Encircling the stem 95 is an expansion coil spring 98 urging the valve disc 96 into sealed relation to the plug bottom for normally closing a plurality of vent passageways 99 through the plug. The valve disc may be formed with a downwardly projecting stub 100 carrying indicia 101 for measuring the level of fluid in the dash-pot.

Fixed on the inner end portion of the tubular piston 88, as by a pin 102, is a cylindrical cage 103 provided with spaced annular interior seats 104, 105, of different internal diameters. Reciprocable between these seats 104, 105, is a valve disc 106 provided with a central aperture 107 and a plurality of apertures 108 forming an annular series of a diameter greater than the internal diameter of the seat 104 but less than that of the seat 105. Upon inward telescopic movement of the piston, the valve disc 106 contacts the seat 104 so that the flow of fluid from the cylindrical tube to the piston is restricted to that finding its way through the central aperture 107.

Referring now to the means F for extending and retracting the arresting member, there is provided, between the caps 86, 89, and in encircling relation to the cylindrical tube 87, an expansion coil spring 109 urging the means E to elongate, thereby extending the arresting member D. Disposed beneath the means E is a cylinder 110 provided at one end portion with a cap 111 pivotally connected to the bracket 85. Reciprocably slidable in the cylinder 110 is a piston 112 fixedly secured to one end of a tubular piston rod 113 extending through a suitably packed cap 114 at the opposite end portion of the cylinder 110. Formed in the caps 111, 114, are ducts 115, 116, connected to suitable conduits 117, 118, through which fluid, such as oil, under pressure may be introduced into either end chamber 119, 120, of the cylinder. Telescopically slidable on the tubular piston rod 113 is a sleeve 121 having one end connected, as by a cap 122, to the rocker arm 77. At its opposite end, the sleeve 121 is provided with an internal annular shoulder 123 engageable with an external annular shoulder 124 adjacent the free end of the piston rod 113. These shoulders 123, 124 provide a lost-motion connection between the piston rod 113 and the sleeve 121.

In order to dispose and hold the combined tail support frame B and arresting member D in the position shown in Figure 1, it is only necessary to introduce and maintain fluid under pressure in the chambers 43, 120 via the conduits 53, 118 respectively, while permitting exhaust of the chambers 41, 119 via the conduits 54, 117. It will, of course, be understood that any suitable valve arrangement (not shown) may be employed for controlling the fluid, preferably from the pilot's compartment.

As shown in Figure 2, the arresting member D may be maintained in an elevated position while the tail support frame B is extended, when an unarrested landing is to be made. By introducing fluid into the chamber 41 and exhausting the fluid from the chamber 43, the extending and retracting link means C is elongated whereby to first partially fold the brace 28 and partially straighten the strut sections 25, 26. Further elongation of means C straightens the brace 28 when the strut sections 25, 26 are extended to a position wherein the strut joint 27 is slightly beyond dead center. As the tail support frame B swings toward its extended position, the link assembly 78 pivots at the clevis 80 about an axis in radially spaced relation above the axle 17 of the tail support frame B in a manner whereby the free end portion of the arresting member D is supported substantially in its position of engagement with the roller 83. While the arrangement is such that only a slight longitudinal shifting of the shank 60 will occur during extension or retraction of the tail support frame or because of longitudinal compression or expansion of the oleo strut section 26 during landing or taxiing of the aircraft, the provision of the roller stop 83 reduces any possible wear of the hook shank 60 to a minimum.

As shown in Figure 3, the arresting member D may be disposed in its lowered position while the tail supporting frame B is extended for the purpose of making an arrested landing. By introducing fluid into the chamber 119 via the conduit 117 and exhausting fluid from the chamber 120 via the conduit 118, the piston rod 113 is retracted from the cylinder 110 whereby to permit lowering of the shank 60 under the influence of the expansion spring 109 and assisted by the force of gravity. Due to the lost motion connection between the piston rod 113 and the sleeve 121, the hook shank 60 may swing upwardly, against the opposition of the expansion spring 109, to the intermediate position shown by broken lines in Figure 3, without affecting the position of the piston rod 113. This upward swinging movement of the arresting hook shank 60 will advance the dampener piston toward the closed end of the cylinder 87 so that the fluid entrapped therein will, in flowing through the valve cage 103, shift the valve disc 106 into a position of engagement with the annular seat 104 whereby to restrict the egress of fluid from the cylinder to that finding its way through the aperture 107.

It will thus be seen that when the tail support frame B is extended, the arresting hook pivot moves down therewith, but due to the linkage between the arresting member D and its extending and retracting means F, the arresting member remains substantially stationary. It will also be seen that for arresting gear operation with the tail support frame B extended, the arresting hook pivot is disposed well below the fuselage and any hook bounce during landing is restricted by the dampener means while overrunning the hook extending and retracting means F at the lost-motion connection therebetween. Furthermore, it will be noted that, in the event of hydraulic pressure failure, the expansion coil spring 52 will urge the tail support frame toward its extended position, and the spring 109 encircling the dampener means E will serve to depress the arresting hook.

Various changes may be made in the form of invention herein shown and described without departing from the spirit of the invention or the scope of the following claims.

What I claim is:

1. In combination with an aircraft fuselage, a pivoted tail support comprising a substantially triangular frame including upper and lower frame members extending downwardly and rearwardly from the fuselage, a ground engaging member carried by the frame, at the distal end portion of the lower frame member, and a trailing arresting member including a forward end portion pivotally secured to the tail support frame at the distal end portion of the upper frame member.

2. In combination with an aircraft fuselage, a pivoted tail support comprising a substantially triangular frame including upper and lower divergent members normally extending downwardly and rearwardly from the fuselage, a ground engaging member carried by the frame at the distal end portion of the lower divergent member, and a trailing arresting hook including a forward end portion pivotally secured to the tail support frame at the distal end portion of the upper divergent member, said arresting hook in its position of normal engagement extending in substantially the same direction as the upper divergent member of the tail support frame when the tail support frame normally extends from the fuselage, whereby the retarding force of the hook is transmitted through the tail support frame to the fuselage in substantially a straight line.

3. The combination with an aircraft fuselage provided with a tail support including a frame extending below the fuselage and a ground engaging member carried by the frame, of an elongate trailing arresting member including a forward end portion pivotally secured to the tail support frame below the fuselage so that the rear end portion of the arresting member is vertically swingable into and out of the fuselage, and resilient means urging the arresting member out of the fuselage.

4. The combination with an aircraft fuselage provided with a tail support including a frame extendable below and retractable within the fuselage, means for extending and retracting the frame, and a ground engaging member carried by the frame, of an elongate trailing arresting member including a forward end portion pivotally secured to the tail support frame at a portion of the frame below the fuselage when the frame is in its extended position, the rear end portion of said arresting member being vertically swingable into and out of the fuselage upon extension of the frame, and resilient means urging the arresting member out of the fuselage.

5. The combination with an aircraft fuselage provided with a tail support including a frame, means pivotally securing the frame to the fuselage for swinging movement between extended and retracted positions, means releasably and resiliently holding the frame in its extended position, and a ground engaging member carried by the frame, of a trailing arresting member pivoted on the frame at a portion of the frame below the fuselage when the frame is extended, whereby said arresting member is vertically swingable between elevated and lowered positions upon extension of the frame, means urging the arresting member toward its lowered position, and means releasably holding the arresting member in its elevated position with its free end portion substantially stationary during pivotal movement of the tail support frame, including a link pivoted to swing about an axis spaced from the axis of said frame pivot means.

6. The combination with an aircraft fuselage provided with a tail support including a frame, means pivotally securing the frame to the fuselage for swinging movement between extended and retracted positions, means releasably and resiliently holding the frame in its extended position, and a ground engaging member carried by the frame, of a trailing arresting member pivoted on the frame at a portion of the frame below the fuselage when the frame is extended, whereby said arresting member is vertically swingable between elevated and lowered positions upon extension of the frame, means urging the arresting member toward its lowered position, stop means fixed in the tail of the fuselage for limiting upward swinging of the arresting member beyond its elevated position, and means releasably supporting the arresting member in its elevated position with its free end portion in engagement with the stop means substantially continuously during pivotal movement of the tail support frame.

7. The combination with an aircraft fuselage provided with a pivoted tail support including a frame, and means for extending and retracting the frame, of a trailing arresting member pivoted to the frame at its forward end portion and swingable between elevated, lowered and intermediate positions when the frame is extended, resilient means urging the arresting member toward its lowered position, means for elevating the arresting member including a lost motion connection so arranged that when the frame is extended the arresting member may swing from its lowered position to an intermediate position against the force of said resilient means, and dampening means resisting movement of said arresting means from its lowered position.

8. The combination with an aircraft fuselage provided with a tail support including a frame extendable below and retractable within the fuselage, means for extending and retracting the frame, and ground engaging means carried by the frame, of a trailing arresting member including a forward end portion pivotally secured to the tail support frame at a portion of the frame below the fuselage when the frame is in its extended position whereby said arresting member is vertically swingable between elevated and lowered positions upon extension of the frame, resilient means urging the arresting member toward its lowered position, and means for elevating the arresting member including a lost motion connection so arranged that when the frame is extended, the arresting member may elevate against the force of said resilient means.

9. The combination with an aircraft fuselage having a tail support including a frame extendable below and retractable within the fuselage, means for extending and retracting the frame, and ground engaging means carried by the frame, of a trailing arresting member including a forward end portion pivotally secured to the tail support frame at a portion of the frame below the fuselage when the frame is in its extended position whereby said arresting member is vertically swingable between elevated and lowered positions upon extension of the frame, hydraulic means including a dash-pot for damping upward swinging movement of the arresting member, independent resilient means urging the arresting member toward its lowered position, and means for elevating the arresting member including a lost motion connection so arranged that when the frame is extended the arresting member may elevate against the force of said resilient means and under the influence of said hydraulic means.

10. The combination with an aircraft fuselage having a tail support including a frame, a pivot securing the frame to the fuselage whereby the frame is extendable below and retractable within the fuselage, means for extending and retracting the frame and a ground engaging member carried by the frame, of a trailing arresting member including a forward end portion pivotally secured to the tail support frame at a portion of the frame below the fuselage when the frame is disposed in its extended position whereby the arresting member is vertically swingable between elevated and lowered positions upon extension of the frame, means for elevating and lowering the arresting member including a rocker arm and a link having one end portion connected to the arresting member and an opposite end portion pivoted to the free end portion of the rocker arm in radially offset relation to the pivot of the tail support frame in a manner whereby the position of the free end portion of the arresting member is not materially affected by movement of the tail support frame about its pivot.

11. The combination with an aircraft fuselage having a tail support including a frame, a pivot securing the frame to the fuselage whereby the frame is swingable between extended and retracted positions, means for extending and retracting the frame, and a ground engaging member carried by the frame, of a trailing arresting member including a forward end portion pivotally secured to the tail support frame at a portion of the frame below the fuselage when the frame is in its extended position whereby said arresting member is vertically swingable between elevated and lowered positions upon extension of the frame, resilient means for lowering the arresting member, means including a servo-motor for elevating the arresting member, said servo-motor being reversible to release the arresting member, a common link connecting said lowering and elevating means each to said arresting member, and a lost motion connection between the servo-motor and the link where by to permit oscillation of said arresting member when the servo-motor is reversed to release the arresting member.

12. In an aircraft having a fuselage, a trailing arresting member pivotally connected at its forward end to the fuselage for swinging movement between lowered and elevated positions, independent resilient means urging the arresting member toward its lowered position, releasable means for elevating and supporting the arresting member, and a lost-motion connection between the arresting member and said elevating and supporting means to permit movement of the arresting member when said elevating and supporting means is released.

13. In an aircraft having a fuselage, a trailing arresting member pivotally connected at its forward end to the fuselage for swinging movement between lowered and elevated positions, a rocker arm having one end pivoted to the fuselage, a link connecting the arresting member and the free end portion of the rocker arm, independent resilient means connected to the rocker arm for urging the arresting member toward its lowered position, and a reversible servo-motor for elevating and supporting the arresting member, said servo-motor having a lost-motion connection to the rocker arm to permit movement of the arresting member when the servo-motor is reversed.

14. In combination with an aircraft fuselage, a tail support including a frame, means pivotally securing the frame to the fuselage for swinging movement between extended and retracted positions, a strut connected between the tail support frame at its free end portion and the fuselage, said strut comprising a pair of sections and being provided with a joint intermediate its sections to permit folding in a given direction for retracting the tail support frame, the strut section connected to the tail support frame being resiliently compressible in the direction of its length to permit retracting movement of the tail support frame for shock absorbing purposes, a brace connected between the strut joint and the fuselage adjacent the pivoted end of the tail support frame and provided with a joint foldable to permit folding of the strut in said given direction, said brace limiting folding of the strut in a direction opposite the given direction, a servo-motor connected between the fuselage and said strut and operable in one direction to extend the strut and in the reverse direction to fold the strut whereby to retract the tail support frame, and resilient means urging the strut into its extended position.

15. In an aircraft arresting device, a cam member, means for mounting the cam member on the aircraft for swinging movement vertically of the aircraft, a trailing arresting member, means for mounting the arresting member on the cam member for swinging movement transversely of the aircraft, a plunger slidably carried by the arresting member and having a head engageable with the cam member, said cam member including a fork shaped cam portion to guide the plunger head into alignment with the cam member, and resilient means carried by the arresting member for urging the plunger head toward the fork shaped cam portion.

16. In an aircraft arresting device, a cam member, means for mounting the cam member on the aircraft for swinging movement vertically of the aircraft, a tubular arresting member, means for mounting the arresting member on the cam member for swinging movement transversely of the aircraft, a plunger reciprocably mounted in the tubular arresting member and having a head engageable with the cam member, said cam member being shaped to guide the plunger head into predetermined relationship to the cam member for aligning the arresting member, and resilient means in the tubular arresting member urging the plunger head toward the cam member.

17. In an aircraft arresting device, a cam member, means for mounting the cam member on the aircraft for swinging movement vertically of the aircraft, a tubular arresting member, means for mounting the arresting member on the cam member for swinging movement transversely of the aircraft, a plunger reciprocably mounted in the tubular arresting member and having a head, a roller carried by the head for engagement with the cam member, said cam member being shaped to guide the plunger roller into predetermined relationship to the cam member for aligning the arresting member, and resilient means in the tubular arresting member urging the plunger roller toward the cam member.

18. In an aircraft arresting device, a cam member having forward and rearward end portions, means for mounting the cam member at its forward end portion on the aircraft for swinging movement vertically of the aircraft, a tubular arresting member provided at its forward end with a clevis, means for mounting the clevis on the cam member intermediate its ends for swinging movement of the arresting member transversely of the aircraft, said cam member at its rearward end portion being provided with a cam surface, a plunger reciprocably mounted in the tubular arresting member and having a head engageable with the cam member, said cam surface being shaped to guide the plunger head toward a position intermediate the ends of the cam surface for aligning the arresting member with the cam member, and resilient means in the tubular arresting member urging the plunger head toward the cam member.

FRANKLIN C. ALBRIGHT.

REFERENCES CITED

The following references are of record in the file of this patent:

UNITED STATES PATENTS

| Number | Name | Date |
|--------|------|------|
| 1,647,619 | Hall | Nov. 1, 1927 |
| 1,360,454 | Shaw | Nov. 30, 1920 |
| 1,405,658 | Bazzeghin | Feb. 7, 1922 |
| 1,922,371 | Jones | Aug. 15, 1933 |